United States Patent
Bi et al.

(10) Patent No.: US 7,636,582 B2
(45) Date of Patent: Dec. 22, 2009

(54) PROVIDING POWER CONTROL IN A REVERSE LINK OF A WIRELESS SPREAD-SPECTRUM DATA NETWORK FOR BURSTY TRAFFIC

(75) Inventors: Qi Bi, Morris Plains, NJ (US); Pi-Chun Chen, Lake Hiawatha, NJ (US); Dongzhe Cui, Parsippany, NJ (US); Stanley Vitebsky, Morristown, NJ (US); Yang Yang, Parsippany, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 823 days.

(21) Appl. No.: 11/241,897

(22) Filed: Sep. 30, 2005

(65) Prior Publication Data

US 2007/0207827 A1  Sep. 6, 2007

(51) Int. Cl.
*H04B 7/00* (2006.01)
*H04Q 7/20* (2006.01)

(52) U.S. Cl. .................. 455/522; 455/13.4; 455/69; 455/127.1; 370/318

(58) Field of Classification Search .............. 370/318, 370/252, 253, 277, 278, 333; 455/69, 13.4, 455/511, 515, 522, 67.11, 115.1, 126, 127.1, 455/161.3

See application file for complete search history.

(56) References Cited

U.S. PATENT DOCUMENTS 7,324,828 B2 * 1/2008 Nagaoka et al. ............ 455/522

(Continued)

OTHER PUBLICATIONS

Ghosh et al, "Control channel design for high speed downlink shared channel for CDMA", Vehicular technology conference; The 57th IEEE, vol. 3, Mar. 2003, pp. 2085-2089.*

(Continued)

*Primary Examiner*—Sujatha Sharma
(74) *Attorney, Agent, or Firm*—Williams, Morgan & Amerson, PC

(57) ABSTRACT

The present invention provides a method and an apparatus for controlling transmission power of a wireless unit. The method includes providing a power control in a reverse link to a network that transmits data on a traffic channel in a bursty manner based on a performance metric of a channel with continuous transmission of other data than on the traffic channel. To provide a power control in a reverse link of a spread-spectrum wireless data network a method and an apparatus are provided for combining performance of a quality of service from at least one of a first quality feedback channel and a second quality feedback channel with that of a pilot channel and providing an outer-loop power control in said reverse link for a wireless communication on a traffic channel based on said combined performance of the quality of service to control transmission power of a wireless unit. A quality of service metric may be associated with one or more channels of the reverse link to determine performance of such a channel when transmission of data on a traffic channel is bursty in nature. Using a performance metric, such as a quality of service metric of a pilot channel, a power control in the reverse link may be provided when data is not transmitted on the traffic channel, e.g., in a bursty traffic channel to control transmission power of a wireless unit. In this manner, the transmission power of the wireless unit may be controlled based on an outer-loop power control that provides a continuous control for a non-continuous transmission.

33 Claims, 4 Drawing Sheets

U.S. PATENT DOCUMENTS

2003/0039217 A1* 2/2003 Seo et al. .................... 370/318
2004/0100911 A1* 5/2004 Kwan et al. ................. 370/252
2006/0050637 A1* 3/2006 Wigard et al. .............. 370/230
2006/0198338 A1* 9/2006 Ishii et al. ................... 370/329
2006/0256732 A1* 11/2006 Hamalainen ................ 370/252

OTHER PUBLICATIONS

Yongjoo Tcha, et al. "QoS Management Subheader for Facilitation of Uplink Scheduling" IEEE, 2004.

* cited by examiner

PROVIDING POWER CONTROL IN A REVERSE LINK OF A WIRELESS SPREAD-SPECTRUM DATA NETWORK FOR BURSTY TRAFFIC

1. FIELD OF THE INVENTION

This invention relates generally to telecommunications, and more particularly, to wireless communications.

2. DESCRIPTION OF THE RELATED ART

Wireless communications systems or mobile telecommunication systems typically provide different types of services to different users or subscribers of wireless communication devices. The wireless communication devices may be mobile or fixed units and situated within a geographic region across one or more wireless networks. The users or subscribers of wireless units or communication devices, such as mobile stations (MSs) or access terminals or user equipment may constantly move within (and outside) particular wireless networks. A wireless unit may encompass additional features and applications than typically available on a conventional cellular phone. Examples of different features and applications include e-mail service, internet access, audio-video interfaces for music and media content streaming.

A wireless communications system generally includes one or more base stations (BSs) that can establish wireless communications links with wireless units. Each wireless unit has an active set, which comprises a set of base stations with which it may communicate. Base stations may also be referred to as node-Bs or access networks. To form the wireless communications link between a wireless unit and a base station, the wireless unit accesses a list of available channels (or carriers) broadcast by the base station. To this end, a wireless communications system, such as a spread-spectrum wireless communications system, may allow multiple users to transmit simultaneously within the same wideband radio channel, enabling a frequency re-use based on a spread-spectrum technique.

In many cellular networks, higher data rates and stringent Quality of Service (QoS) requirements demand an improved management of radio frequency (RF) resources, such as control of transmission power in a wireless communication link. To accomplish transmission power control, transmit power is typically controlled in two ways. In a first implementation, a power control decision is determined by a receiver. In a second implementation, a power control decision is determined by a transmitter. Traditionally the first implementation has been used due to lack of feedback channels in a conventional wireless communications system.

However, feedback information may now be obtained in a high-speed wireless data network using a power control command channel. In high-speed wireless data networks, such as Evolved Data Optimized (EVDO), Evolution Data Voice (EVDV), traffic transmission uses different channel feedback techniques. For example, a reverse link traffic channel is used in an EVDO Rev. A network, which incorporates a hybrid automatic repeat request (HARQ) technique with use of a forward automatic repeat request (ARQ) channel to obtain the feedback. A reverse link Data Rate Control (DRC) channel in an EVDO network specifies use of a forward Data Rate Control Lock (DRC Lock) channel as the feedback.

Many wireless data networks that operate in a code division multiple access (CDMA) mode generally employ power control to overcome a near-far problem. To this end, a close-loop power control is employed to adjust transmission power of a wireless unit. The power control may be deployed for both an inner-loop and an outer-loop based on a desired packet reception performance and a packet error target. For example, high-speed wireless data networks, such as EVDO and EVDV that use a CDMA protocol in a reverse link for a reliable and robust performance may deploy power control. In such systems, power control is typically used to optimize the aggregate sector throughput while achieving the target user performance for a reverse link channel structure. The reverse link channel structure may comprise pilot (PICH), traffic, quality feed back channel such as DRC and CQI, and several others (such as ACK, DSC, etc). Among all channels, however, pilot is used as the power reference and all other channels are transmitted with a power of pre-set power offset relative to pilot.

A conventional outer-loop power control for CDMA voice services is driven by the error events of the traffic channel to adjust the set-point that is used as the reference to adjust the transmission power of a wireless unit via an inner-loop power control. One objective of the outer-loop power control is to achieve a target Frame Error Rate (FER) for the voice service to ensure the voice quality.

The outer-loop power control described above provides a continuous control as voice traffic is continuous circuit-type traffic. However, this condition doesn't hold for the high speed data network such as EVDO/EVDV, where the data traffic is inherently bursty. The traffic channel manifests on-off characteristics, thus the conventional outer-loop power control loses the input when there is no packet sent over the traffic channel. Therefore, when the conventional method is used for providing an outer-loop power control in an EVDO/EVDV network driven by a bursty traffic channel, the actual user received power may not be controlled as expected. This inadequate power control may lead to a degraded or inconsistent performance in an aggregate sector as well as on an individual user basis.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

The present invention is directed to overcoming, or at least reducing, the effects of, one or more of the problems set forth above.

In one embodiment of the present invention, a method is provided for controlling transmission power of a wireless unit. The method includes providing a power control in a reverse link to a network that transmits data on a traffic channel in a bursty manner based on a performance metric of a channel with continuous transmission of other data than on the traffic channel.

In another embodiment of the present invention, a method is provided for providing a power control in a reverse link of a spread-spectrum wireless data network. The method includes combining performance of a quality of service from at least one of a first quality feedback channel and a second quality feedback channel with that of a pilot channel. The method further includes providing an outer-loop power control in the reverse link for a wireless communication on a traffic channel based on the combined performance of the quality of service to control transmission power of a wireless unit.

BRIEF DESCRIPTION OF THE DRAWINGS

The invention may be understood by reference to the following description taken in conjunction with the accompanying drawings, in which like reference numerals identify like elements, and in which.

Figure 1:
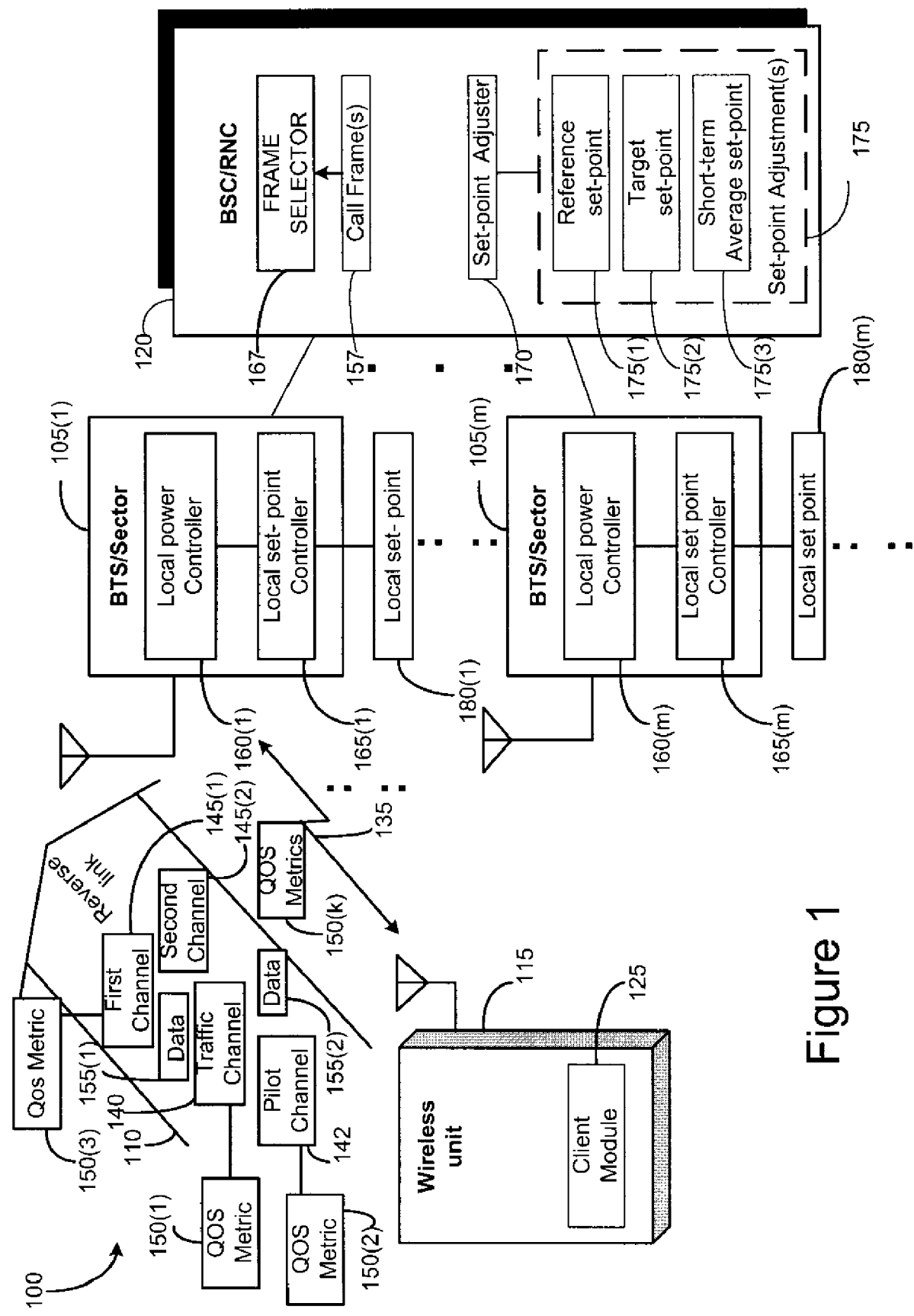
FIG. 1 schematically depicts a spread-spectrum wireless data network, which includes a plurality of base transceiver stations/sectors coupled to a base station controller or a radio network controller to provide power control in a reverse link according to one illustrative embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions may be made to achieve the developers' specific goals, such as compliance with system-related and business-related constraints, which will vary from one implementation to another. Moreover, it should be appreciated that such a development effort might be complex and time-consuming, but may nevertheless be a routine undertaking for those of ordinary skill in the art having the benefit of this disclosure.

Generally, a method and an apparatus are provided for controlling transmission power of a wireless unit. The method includes providing a power control in a reverse link to a network that transmits data on a traffic channel in a bursty manner based on a performance metric of a channel with continuous transmission of other data than on the traffic channel. To provide a power control in a reverse link of a spread-spectrum wireless data network a method and an apparatus are provided. The method includes combining performance of a quality of service from a first or a second quality feedback channel with that of a pilot channel. Accordingly, an outer-loop power control may be provided in the reverse link for a wireless communication on a traffic channel based on the combined performance of the quality of service to control transmission power of a wireless unit. One example of the first quality feedback channel includes a dynamic rate control (DRC) channel. Likewise, one example of the second quality feedback channel includes a channel quality indicator (CQI) channel. A Quality of Service (QoS) metric may be associated with one or more channels of the reverse link to determine performance of such a channel when transmission of data on a traffic channel is bursty in nature. In other words, a non-continuous transmission of data may occur on the traffic channel in a spread-spectrum wireless data network while another channel on the reverse link may provide a continuous transmission of other data than the data transmitted on the traffic channel. Using the performance metric, such as the QoS metric of a pilot channel, a power control in the reverse link may be provided when data is not transmitted on the traffic channel. Accordingly, when data is transmitted in a bursty manner over the traffic channel, a power control may be provided based on the QoS metric of the pilot channel to control transmission power of a wireless unit. In this manner, the transmission power of the wireless unit may be controlled based on an outer-loop power control that provides a continuous control for a non-continuous transmission.

Referring to FIG. 1, a spread-spectrum wireless data network 100 is illustrated to include a first base transceiver station (BTS)/sector 105(1) and a second base transceiver station (BTS)/sector 105($m$) that may control transmission power based on one or more performance metrics associated with one or more channels of a reverse link 110 according to one embodiment of the present invention. The first and second base transceiver stations (BTSs)/sectors 105(1,$m$) may provide the wireless connectivity to a wireless unit 115 according to any desirable protocol, including a Code Division Multiple Access (CDMA, CDMA2000) protocol, an Evolved Data Optimized (EVDO, 1xEV-DO) protocol, a Universal Mobile Telecommunication System (UMTS) protocol, a Global System for Mobile communications (GSM) protocol, and like.

Examples of the wireless unit 115 may include a host of wireless communication devices including, but not limited to, cellular telephones, personal digital assistants (PDAs), and global positioning systems (GPS) that employ the spread-spectrum wireless data network 100 to operate in a high-speed wireless data network, such as a digital cellular CDMA network. Other examples of the wireless unit 115 may include smart phones, text messaging devices, and the like.

According to one illustrative embodiment of the present invention, the wireless unit 115 may comprise a client module 125 that may include a transmitter (TX) that controls transmission power in the reverse link 110 from the wireless unit 115 to the first base transceiver station/sector 105(1). The transmitter may be suitably implemented at the wireless unit 115 in any number of ways using hardware, software, or a combination thereof to enable the power control in the reverse link 110.

In one embodiment, the reverse link 110 may include a channel structure that comprises a traffic channel 140, a pilot channel (PICH) 142 a first quality feedback channel 145(1) and a second quality feedback channel 145(2). One example of the first quality feedback channel includes a dynamic rate control (DRC) channel. Likewise, one example of the second quality feedback channel 145(2) includes a channel quality indicator (CQI) channel. For each channel of the reverse link 110, a Quality of Service (QoS) metric 150(1-$k$) may indicate performance of that channel when transmission of data on the traffic channel 140 is bursty in nature. In other words, a non-continuous transmission of data may occur on the traffic channel 140. That is, the spread-spectrum wireless data network 100 may transmit data 155(1) on the traffic channel 140 in a bursty manner while another channel on the reverse link 110 may provide a continuous transmission of other data 155(2) than the data 155(1) transmitted on the traffic channel 140.

To control transmission power of the wireless unit 115 based on a power control in the reverse link 110, each base transceiver station/sector 105 may comprise a local power controller 160. Additionally, to provide an outer-loop power control for a service, such as a CDMA voice service, each base transceiver station/sector 105 may further comprise a controller 165 that adjusts a local set-point associated with the power control. The local set-point may be used to adjust the transmission power of the wireless unit 115.

For providing a power control in the reverse link 110, in one embodiment, the base station controller (BSC)/radio network controller (RNC) 120 may comprise a frame selector 167. The frame selector 167 may select one or more frames from frame(s) 157 associated with a call. The frame selector 167 may compare the frames received by at least two base transceiver stations(BTSs) of the base transceiver stations/sectors 105(1-m) to identify the better frame. This makes it possible for two (or more) base stations of a set of base stations 105(1-m) to seamlessly support the wireless unit 115. The base station controller/radio network controller 120 may further comprise a set-point adjuster 170 to adjust a set-point that may be used as a reference set-point 175(1) to adjust the transmission power of the wireless unit 115. The set-point adjuster 170 may store and provide or maintain a target set-point 175(2) and a short-term average set-point 175(3). In this manner, the set-point adjuster 170 may provide one or more set-point adjustment(s) 175.

In operation, at least one base transceiver station(BTS)/sector of the base transceiver stations/sectors 105(1-m) and the base station controller/radio network controller 120 may provide a power control in the reverse link 110 for controlling transmission power of the wireless unit 115. According to one embodiment of the present invention, to provide such power control, a performance metric of a channel, such as the pilot channel 142 having the QoS metric 150(2) may be used. However, any channel other than the traffic channel 140 which provides a continuous transmission of other data 155(2) than the transmission of data 155(1) on the traffic channel 140 may be used to determine the performance metric, such as quality of service (QoS) associated with a service.

Using the performance metric, such as the QoS metric 105(2) of the pilot channel 142, a power control in the reverse link 110 may be provided when the data 155(1) is not transmitted on the traffic channel 140. That is, when the data 155(1) is transmitted in a bursty manner over the traffic channel 140, a power control may be provided based on the QoS metric 105(2) of the pilot channel 142 to control transmission power of the wireless unit 115. In this manner, the transmission power of the wireless unit 115 may be controlled based on an outer-loop power control that provides a continuous control for a non-continuous transmission.

Figure 2:
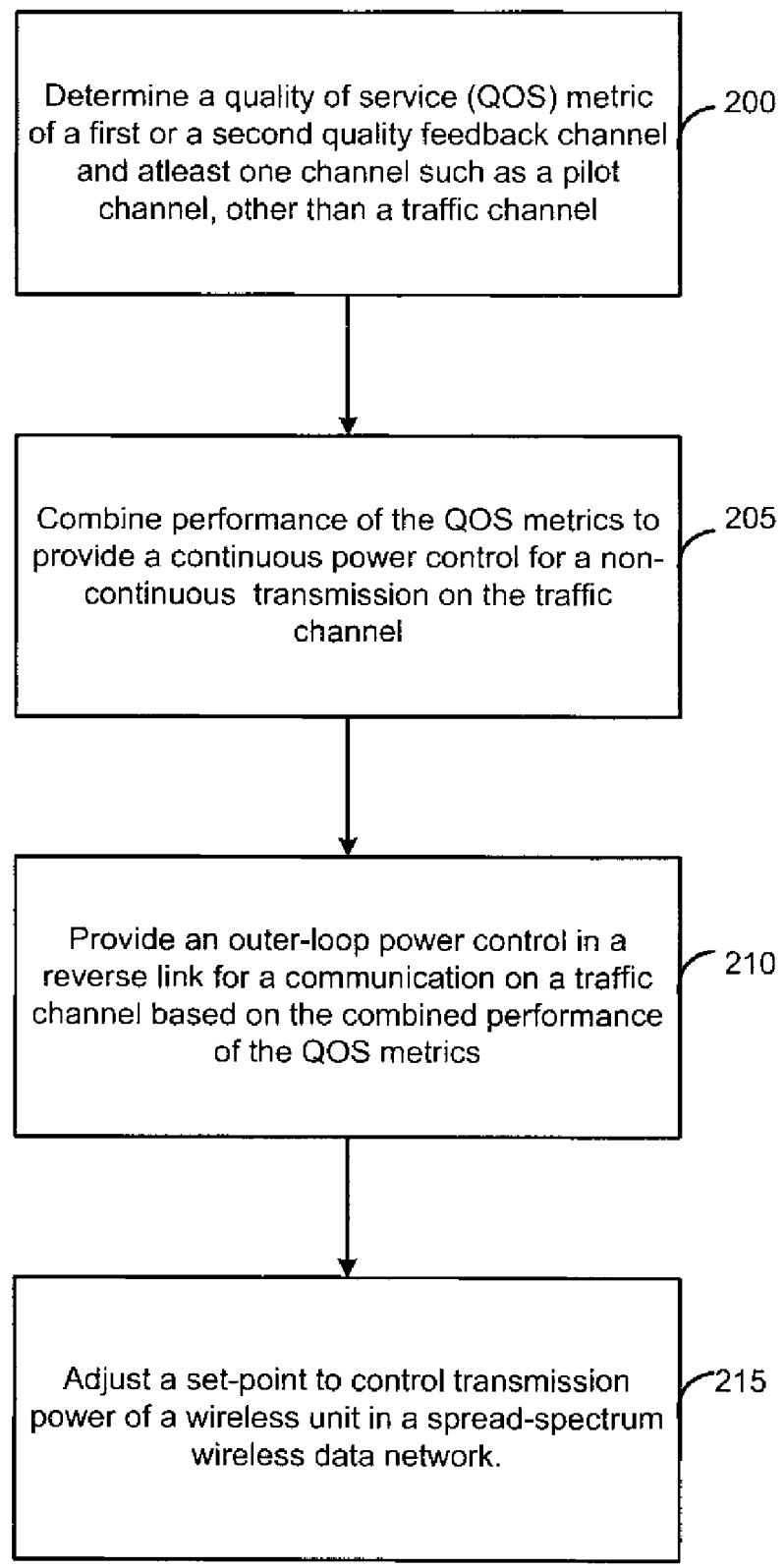
FIG. 2 depicts a stylized representation for implementing a method of controlling transmission power of a wireless unit by providing reverse link power control as shown in FIG. 1, consistent with one exemplary embodiment of the present invention.

Referring to FIG. 2, a stylized representation for implementing a method of controlling transmission power of the wireless unit 115 by providing a power control in the reverse link 110 is illustrated in accordance with one embodiment of the present invention. At block 200, the base transceiver station/sector 105(1) and the base station controller/radio network controller 120 may determine the QoS metric 105(3), 150(k) for the first quality feedback channel 145(1) and the second quality feedback channel 145(2), respectfully. The quality of metric performance of another channel different than the traffic channel 140 may be determined as well. For example, the QoS metric 150(2) associated with the pilot channel 142 may be determined at block 200.

As indicated in block 205, performance of the QoS metrics determined at block 200 for different channels other than the traffic channel 140 in the reverse link 110 may be selectively combined to provide a continuous power control for a non-continuous transmission on the traffic channel 140. In one embodiment, the QoS metric 150(3) associated with the first quality feedback channel may be combined with the QoS metric 150(2) of the pilot channel 142. Alternatively, the QoS metric 150(k) associated with the second quality feedback channel 145(2) may be combined with the QoS metric 150(2) of the pilot channel 142.

By combining performance of a quality of service (QoS) metric from at least one of the first quality feedback channel 145(1) and the second quality feedback channel 145(2) with that of the pilot channel 142, a power control in the reverse link 110 may be provided for a wireless communication on the traffic channel 140. That is, based on the combined performance of the quality of service metrics, an outer-loop power control may provide the power control in the reverse link 110 for a wireless communication between the wireless unit 115 and at least one of the base transceiver stations/sectors 105(1-m). To this end, the QoS metric 150(3) associated with the first quality feedback channel, such as a DRC channel may be used. Likewise, the QoS metric 150(k) associated with the second quality feedback channel 145(2), such as a CQI channel may be used.

The local power controller 160(1), the local set-point controller 165(1) of the base transceiver station/sector 105(1) may cause the set-point adjuster 170 at the base station controller/radio network controller 120 to provide an outer-loop power control in the reverse link 110 for a wireless communication on the traffic channel 140, as shown in block 210. The outer-loop power control may be based on the combined performance of the QoS metrics indicated at the block 205.

In one embodiment, an outer-loop power control for a service, such as a CDMA voice service may be driven by the performance metric of another channel than the traffic channel 140. To this end, a set-point of the power control may be adjusted, where the set-point may be used as a reference to adjust the transmission power of the wireless unit 115 when the spread-spectrum wireless data network 100 is driven by the traffic channel 140, transmitting in a bursty manner. Such an outer-loop power control may adjust the transmission power of the wireless unit 115 for one or more packets associated with the data 155(1) being sent over the traffic channel 140 in a non-continuous transmission.

By controlling the transmission power of the wireless unit 115 based on an outer-loop power control described above, a continuous control may be provided for power in the spread-spectrum wireless data network 100. In other words, the transmission power of the wireless unit 115 may be controlled based on an outer-loop power control that provides a continuous power control for the non-continuous transmission.

In one embodiment, the channel other than the traffic channel 140, used for the power control in the reverse link 110, such as the pilot channel 142 may be used to provide a continuous input sequence independent of the traffic channel 140 for an outer-loop power control. In this way, the continuous input sequence may drive the outer-loop power control during a discontinuity in a traffic stream on the traffic channel 140. For example, the outer-loop power control may be driven based on quality of service of at least one of a dynamic rate control (DRC) control feedback channel and a channel quality indicator (CQI) feedback channel and the pilot channel 142.

At block 215, a set-point associated with the outer-loop power control may be adjusted to control the transmission power of the wireless unit 115 in the spread-spectrum wireless data network 100, as shown in FIG. 1. The set-point may be used as a reference when the spread-spectrum wireless data network 100 is driven by the traffic channel 140 in a bursty manner, i.e., one or more packets associated with the data 155(1) sent over the traffic channel 140 are being sent in a non-continuous transmission.

By controlling the transmission power of the wireless unit 115 based on the outer-loop power control, a continuous power control for the non-continuous transmission over the traffic channel 140 may be provided. The outer-loop power control may be driven by a continuous input sequence independent of the traffic channel 140 during a discontinuation in a traffic stream on the traffic channel 140.

To adjust the transmission power of the wireless unit 115, each sector 105 of an active set of sectors may maintain a local set-point 180 for the reference set-point 175(1). The local power controller 160, the local set-point controller 165 and the set-point adjuster 170 may update the local set-point 180 in each sector 105 on a per frame basis or a sub-packet level based on the combined performance of the quality of service metrics.

The spread-spectrum wireless data network 100, may deploy any desirable protocol to enable wireless communications including high-speed data between the first and second base transceiver stations/sectors 105(1), 105(m) and the wireless unit 115 according to any desirable protocol. Examples of such a protocol include a (CDMA, CDMA2000) protocol, an Evolved Data Optimized (EVDO, 1xEV-DO) protocol, a UMTS protocol, a GSM protocol, and like.

The base station controller (BSC) radio network controller/(RNC) 120 may be coupled to the first and second base transceiver station/sectors 105(1-m) to enable a mobile user of the wireless unit 115 to communicate relatively high-speed wireless data over a high-wireless data a speed network. One example of a high-speed wireless data network includes a digital cellular network based on a CDMA protocol, such as specified by the 3rd Generation (3G) Partnership Project (3GPP) specifications. The 3G cellular systems provide enhanced voice capacity and support high data rate packet based services. These features are provided in CDMA2000 1xEV high rate packet data air system referred to as IS-856. The 3G cellular system CDMA2000 1xEV provides high-speed wireless Internet access to users with asymmetric data traffic relative to a cellular system based on IS-95 standard. For example, data rate of a user of the wireless unit 115 may very from 9.6 kbps to 153.6 kbps.

Other examples of such a protocol include a 1xEV-DO protocol, a UMTS protocol, a GSM protocol, and like. The base station controller (BSC) radio network controller/(RNC) 120 may manage exchange of wireless communications between the wireless unit 115 and the first and second base transceiver stations/sectors 105(1-m) according to one illustrative embodiment of the present invention. Although two base transceiver stations/sectors 105(1), 105(m) and one base station controller (BSC) radio network controller/(RNC) 120 are shown in FIG. 1, persons of ordinary skill in the pertinent art having benefit of the present disclosure should appreciate that any desirable number of base transceiver station/sectors 105 and base station controller (BSC) radio network controller/(RNC) 120 may be used.

Each of the first and second base transceiver stations/sectors 105(1), 105(m), sometimes referred to as Node-Bs may provide connectivity to associated geographical areas within the spread-spectrum wireless data network 100. Although the spread-spectrum wireless data network 100 is shown to include the first and second base transceiver stations/sectors 105(1), 105(m) coupled to the base station controller (BSC) radio network controller/(RNC) 120 in FIG. 1, persons of ordinary skill in the art should appreciate that portions of the spread-spectrum wireless data network 100 may be suitably implemented in any number of ways to include other components using hardware, software, or a combination thereof. High-speed wireless data networks are known to persons of ordinary skill in the art and so, in the interest of clarity, only those aspects of the spread-spectrum wireless data network 100 that are relevant to the present invention will be described herein.

Consistent with one embodiment, the wireless unit 115 may transmit messages to the first base transceiver station/sector 105(1) or the second base transceiver station/sector 105(m) over the reverse link 110. A forward link may provide messages to the wireless unit 115. The messages may include traffic packets and signaling messages. The CDMA2000 1xEV-DO specification uses a frequency band with channel bandwidth (1.23 MHz) and chip rate (1.2288 Mcps). In CDMA2000 1xEV-DO, for example, each forward link frame is 26.666 msec and consists of 16 slots. Like the forward link, the reverse link frame is 26.666 msec and consists of 16 slots.

In the spread-spectrum wireless data network 100, mobile communications that communicate the messages between the first and second base transceiver station/sectors 105(1-m) and the wireless unit 115 may occur over an air interface 135 via a radio frequency (RF) medium that uses a Code Division Multiple Access (CDMA) protocol to support multiple users. When moving within the high-speed wireless data network 100, such as a digital cellular CDMA network, a handover of mobile communications occurs for the wireless unit 115 upon a user leaving an area of responsibility of a first cell, namely, into a new cell. This handover may be coordinated by the base station controller (BSC) radio network controller/(RNC) 120.

Figure 3:
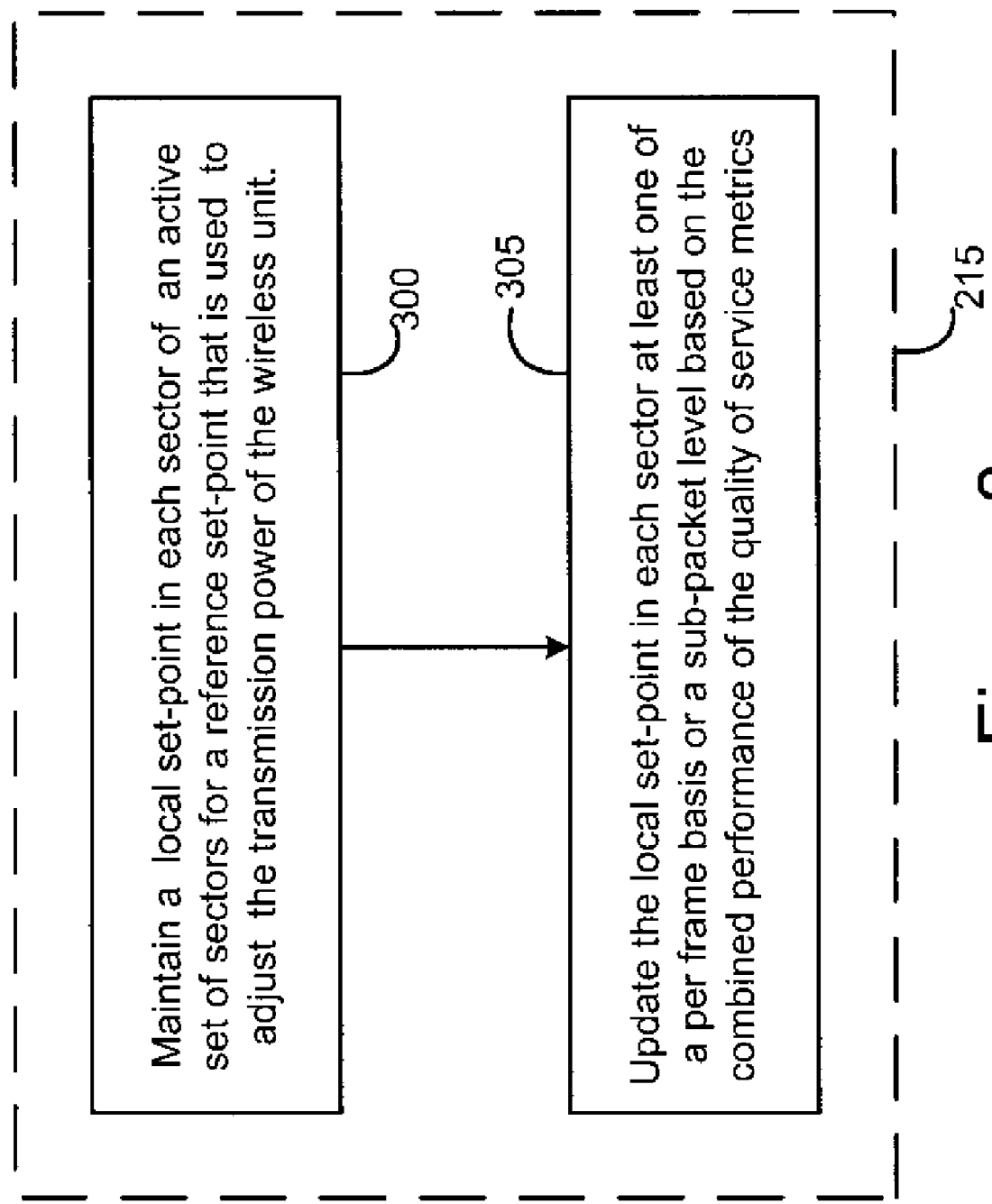
FIG. 3 illustrates a stylized representation of one exemplary embodiment of the instant invention for implementing a method of providing an outer-loop power control based on a set-point adjustment in the reverse link of the spread-spectrum wireless data network for a bursty traffic channel using a performance metric of another channel.

Referring to FIG. 3, a stylized representation of an exemplary embodiment for implementing a method of providing an outer-loop power control based on one or more set-point adjustment(s) 175 is illustrated. The outer-loop power control uses a performance metric of another channel than the traffic channel 140 in the reverse link 110 of the spread-spectrum wireless data network 100 for the bursty traffic channel 140. To obtain one or more set-point adjustment(s) 175, at block 215 in FIG. 2, a local set-point 180 may be maintained in each base transceiver station/sector 105 of an active set of base transceiver stations/sectors 105(1-m) for the reference set-point 175(1), as depicted at block 300. The reference set-point 175(110) may be used to adjust the transmission power of the wireless unit 115. In other words, the reference set-point 175(1) provides a set-point associated with the power control and the set-point adjuster 170 may provide an adjustment to this set-point, in one embodiment of the present invention.

To provide an adjustment to the reference set-point 175(1), at block 305, the local set-point 180 in each base transceiver station/sector 105 may be updated. For example, the local power controller 160 and the local set-point controller 165 at the base transceiver station/sector 105 may update the local set-point 180 on a per frame basis or a sub-packet level based on the combined performance of the quality of service.

Figure 4:
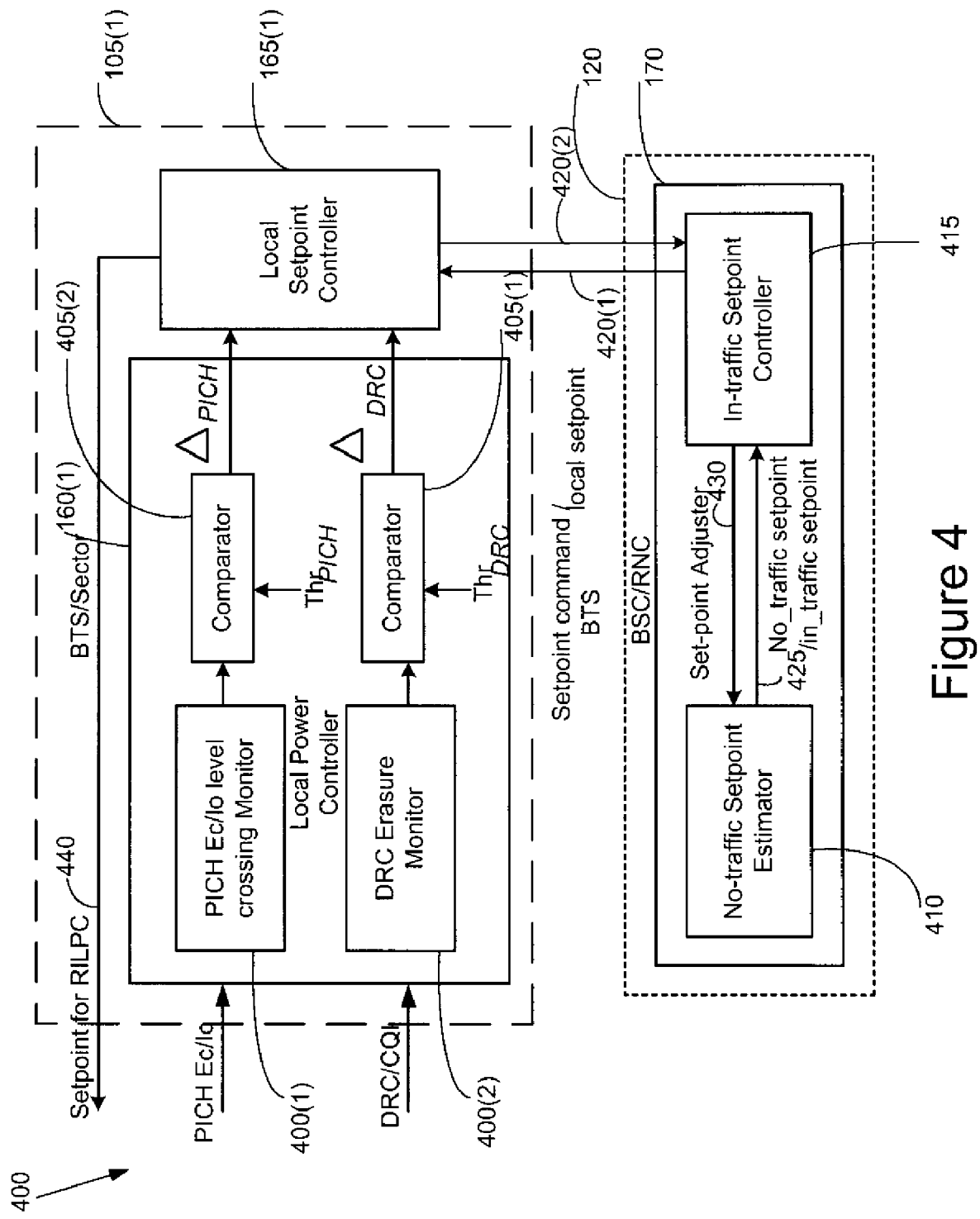
FIG. 4 conceptually illustrates an outer-loop power control based on the combined channel quality of service performance in accordance with one embodiment of the present invention.

Turning now to FIG. 4, an outer-loop power control 400 conceptually illustrates a method for providing transmission power control of the wireless unit 115 based on a power control provided in the reverse link 110, in accordance with one embodiment of the present invention. The outer-loop power control 400 may be based on the combined channel quality of service performance of one or more channels other than the traffic channel 140 in the reverse link 110. Consistent with one embodiment of the present invention, the outer-loop power control 400 may be distributed across one or more base transceiver stations/sectors 105(1-*m*) and the base station controller/radio network controller 120. In other words, the outer-loop power control 400 may comprise the local set-point controller 165(1) coupled to the local set-point controller 165(1) at the base transceiver station/sector 105(1) and the set-point adjuster 170 disposed at the base station controller/radio network controller 120.

The local power controller 160(1) may comprise a first monitor 400(1) that measures an average pilot chip energy to noise and interference power density ratio (Ec/Io) over a frame or a sub-frame duration for the pilot channel 142. The local power controller 160(1) may further comprise a second monitor 400(2) to measure a number of radio frequency (RF) quality feedback channel erasures associated with the dynamic rate control (DRC) channel for the first quality feedback channel 145(1). Alternatively, the second monitor 400(2) may measure the number of RF quality feedback channel erasures associated with the channel quality indicator (CQI) channel for the second quality feedback channel 145(2) during the last frame or sub-packet. For measuring the erasures, a performance target for the dynamic rate control channel or the channel quality indicator channel may be defined, in one embodiment.

For example, the base transceiver station/sector 105(1) measures the number of RF quality feedback channel DRC/CQI erasures during the last frame or sub-packet, show as n. The DRC/CQI performance target is defined as a range (Thr$_{DRC\_low}$, Thr$_{DRC\_high}$). The short-term DRC/CQI erasure upper bound is indicated as Thr$_{DRC\_high}$ and the long-term DRC/CQI erasure lower bound as Thr$_{DRC\_low}$.

A serving base transceiver station/sector, such as the base transceiver station/sector 105(1) may calculate an erasure rate. A short-term erasure rate and a long-term erasure rate may be measured, in one embodiment. The local power controller 160(1) may further comprise a first comparator 405(1) to compare the measured short-term and the long-term erasure rates against an erasure target associated with the dynamic rate control channel. To calculate the erasure rate, an example is shown below:

$$E_{low}(l) = E_{low}(l-1) * \frac{T_l - 1}{T_l} + \frac{n}{N} * \frac{1}{T_l}$$

$$E_{high}(l) = E_{high}(l-1) * \frac{T_h - 1}{T_h} + \frac{n}{N} * \frac{1}{T_h}$$

where $E_{low}$ and $E_{high}$ are the measured short-term and long-term erasure rates comparing against the DRC erasure targets.

l is the index for current frame or sub-packet.

N is the total number of DRC/CQI samples received in the last frame or sub-packet.

$T_l$ and $T_h$ are the time constants used in the smoothing filters in the unit of frames or sub-packets.

The base transceiver station/sector 105(1) may derive a set-point adjustment corresponding to the quality of service channel performance metric of the dynamic rate control channel or the channel quality indicator channel. To derive a set-point adjustment corresponding to the DRC/CQI channel performance, an example is shown below:

$$\Delta_{DRC} = \begin{cases} \delta_u^{DRC} & E_{high}(l) > Thr_{DRC\_high} \\ -\delta_d^{DRC} & E_{low}(l) < Thr_{DRC\_low} \\ 0 & \text{otherwise} \end{cases}$$

The local set-point controller 165(1) may adjust the local set-point 180(1) based on the set-point adjustment for the reference set-point 175(1). To compare the average pilot chip energy to noise and interference power density ratio with a threshold, the local power controller 160(1) may comprise a second comparator 405(2). The second comparator 405(2) may determine whether a pilot error event is detected based on the threshold. To this end, a pilot error rate may be computed using an averaging filter. The pilot error rate may be compared with a target pilot error rate to determine the set-point adjustment for the reference set-point 175(1), in one embodiment.

To adjust a local set-point 180(1), such as S(l) $\Delta_{DRC}$ may be taken into consideration. In another embodiment, in each update process, the base transceiver station/sector 105(1) may perform the following steps:

a. The base transceiver station/sector 105(1) measures the average pilot a chip energy to noise and interference power density ratio (Ec/Io) over frame or a sub-frame duration. The average Ec/Io may be selectively further filtered.

b. The base transceiver station/sector 105(1) compares the average pilot Ec/Io with a configurable threshold. If the measured pilot Ec/Io is below threshold, the "pilot error event" is detected.

c. The base transceiver station/sector 105(1) computes a pilot error rate (PICHER) using an Infinite Impulse Response (IIR) filter (or another suitable averaging procedure). For example:

$$PICHER(l) = PICHER(l-1) * \frac{Tp - 1}{Tp} + PICH\_ERROR * \frac{1}{Tp},$$

where PICH_ERROR equals 1 if the measured pilot Ec/Io is below threshold and 0 if it is above, Tp is a time constant used for smoothing in units of frames.

d. The base transceiver station/sector 105(1) compares the pilot error rate (PICHER) with the target pilot error rate picher_threshold (or pilot Ec/Io level crossing rate) to determine the set-point adjustment:

$$\Delta_{PICH} = \begin{cases} \delta_u^{PICH} & PICHER(l) > \text{picher\_threshold} \\ -\delta_d^{PICH} & PICHER(l) < \text{picher\_threshold} \\ 0 & \text{otherwise} \end{cases}$$

In another embodiment, instead of computing the pilot error rate, the base transceiver station/sector 105(1) may adjust the reference set-point 175(1). The set-point adjustment to the reference set-point 175(1) may be based on a predetermined amount. For example, if the measured average pilot chip energy to noise and interference power density ratio (Ec/Io) is determined to be below the threshold, the reference set-point 175(1) may be adjusted up, i.e., increased by the predetermined amount. Conversely, if the measured average pilot chip energy to noise and interference power density ratio is indicated to be above the threshold, the reference set-point 175(1) may be adjusted down, i.e., decreased by the predetermined amount.

For example, instead of computing the PICHER, the base transceiver station/sector 105(1) may adjust the reference set-point 175(1) up by $\delta_u^{PICH}$ if the measured Ec/Io is below the configurable Ec/Io threshold and down by the $\delta_d^{PICH=\delta}{}_u^{PICH}$/picher_threshold if the measured Ec/Io is above the threshold. This may enforce the Ec/Io level crossing rate at a given Ec/Io threshold to be equal picher_threshold.

In yet another embodiment, a set-point adjustment 175 may be based on the quality of service performance combined across the dynamic rate control (DRC) channel or the channel quality indicator (CQI) channel and the pilot channel (PICH). This set-point adjustment 175 may determine a frame adjustment of the local set-point 180(1). By using the local set-point controller 165(1), the base transceiver station/sector 105(1) may adjust the local set-point 180(1) based on the combined performance metrics of one or more channels, in the reverse link 110, other than the traffic channel 140. Accordingly, the set-point adjustments 175 for the reference set-point 175(1) may be adjusted at the base transceiver station/sector 105(1).

For example, the adjustments based on DRC/CQI and PICH performance are combined (in various ways) by the base transceiver station/sector 105(1) to make a final per-frame adjustment of a local set-point.

Using the frame selector 167 for the reverse link 120 at the base station controller (BSC)/radio network controller (RNC) 120, one or more frames from the frames 157 associated with a call may be selected. Based on a post frame selection performance of the traffic channel 140, the base station controller/radio network controller 120 may provide the set-point adjustments 175, in one embodiment. To this end, the base station controller (BSC) radio network controller/(RNC) 120 may communicate with the base transceiver station/sector 105(1) to obtain a consistent view on the set-points. To this end, the base station controller (BSC) radio network controller/(RNC) 120 may maintain the short-term average set-point 175(3) to reset the target set-point 175(2). An example of determining a short-term average set-point is shown as:

$$R_{ave}(l) = R_{ave}(l-1) * \frac{T_R - 1}{T_R} + R(l) * \frac{1}{T_R}$$

where $T_R$ is the time constant for the filter, and R(l) is the set-point used by the base station controller (BSC) radio network controller/(RNC) 120 at a frame or a sub-packet level.

The set-point adjuster 170 may comprise an estimator 110 that estimates a set-point when no traffic is detected or transmitted on the traffic channel 140. In addition, the set-point adjuster 170 comprises a controller 415 that controls the set-point adjustments 175 when traffic is detected or transmitted on the traffic channel 140. The base station controller/radio network controller 120 communicates a set-point command over to the base transceiver station/sector 105(1), as indicated by an arrow 420(1). The base station controller/radio network controller 120 may receive the local set-point 180(1) from the base transceiver station/sector 105(1). To indicate that no traffic is indicated on the traffic channel 140, the controller 415 provides a no traffic set-point indication 430 to the estimator 410. The estimator 410 may estimate a no-traffic set-point in response to no-traffic set-point indication 430.

Alternatively, in response to an in-traffic set-point indication 425, the controller 415 receives an in-traffic set-point from the estimator 410. The set-point adjuster 170 provides the set-point command 420(1) to the local set-point controller 165(1) at the base transceiver station/sector 105(1). The local set-point controller 165(1) provides a set-point for reverse link inner-loop power control (RILPC), as indicated by an arrow 440.

The reference set-point 175(1) may be adjusted by selecting a lowest local set-point from each base transceiver station/sector 105 of the plurality of base transceiver stations/sectors 105(1-m) in an active set communication with the base station controller/radio network 120. The local set-point 180(1) may be adjusted at the base transceiver station 105(1) based on a quality of service performance indication of at least one of a dynamic rate control (DRC) channel and a pilot channel (PICH) until a traffic frame on the traffic channel 140 is received. The set-point adjuster 170 at the base station controller/radio network controller 120 may determine whether a traffic frame is received on the traffic channel 140. If a traffic frame is received, the local set-point 180(1) may be adjusted based on the QoS metric 150(1) associated with the traffic channel 140 or based on a combination of QoS performance metric of at least one of the traffic channel 140, a dynamic rate control (DRC) channel and a pilot channel (PICH).

If the base station controller (BSC) radio network controller/(RNC) 120 does not receive any packet from any BTS 105 for m frames or sub-packet durations, the base station controller (BSC) radio network controller/(RNC) 120 may reset the target set-point $R=R_{ave}$, where m is the pre-set number of idle frame or sub-packet durations that triggers the base station controller (BSC) radio network controller/(RNC) 120 to reset the target set-point. The set-point is then adjusted by selecting the lowest local set-point from each base transceiver station/sector 105. The local set-point is adjusted based on DRC and/or PICH performance until the traffic frame (good or erasure) is received. Once the traffic frame is received, the local set-point is adjusted based on traffic QoS or based on combination of traffic QoS, DRC and/or PICH performance.

One or more feedback channels available for other purposes than power control command, for example, in EVDO Rev. A, multiple ARQ channels may be used on a forward link to feedback receipt information of a reverse traffic channel. When there is no traffic channel activity and it is still desirable to control the wireless unit 115 transmission power to achieve a target performance for the reverse control channel, such as the DRC channel, the wireless unit 115 may use a feedback channel, such as the DRCLock channel, to provide power control in the spread-spectrum wireless data network 100.

In one embodiment, the spread-spectrum wireless data network 100 may wirelessly communicate mobile data at a speed and coverage desired by individual users or enterprises. According to one embodiment, the spread-spectrum wireless data network 100 may comprise one or more data networks, such as Internet Protocol (IP) network comprising the Internet and a public telephone system (PSTN). The 3rd generation (3G) mobile communication system, namely Universal Mobile Telecommunication System (UMTS) supports multimedia services according to 3rd Generation Partnership Project (3GPP) specifications. The UMTS also referred as Wideband Code Division Multiple Access (WCDMA) includes Core Networks (CN) that are packet switched networks, e.g., IP-based networks. Because of the merging of Internet and mobile applications, the UMTS users can access both telecommunications and Internet resources. To provide an end-to-end service to users, a UMTS network may deploy a UMTS bearer service layered architecture specified by Third Generation Project Partnership (3GPP) standard. The provision of the end-to-end service is conveyed over several networks and realized by the interaction of the protocol layers.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention set forth above is described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

While the invention has been illustrated herein as being useful in a telecommunications network environment, it also has application in other connected environments. For example, two or more of the devices described above may be coupled together via device-to-device connections, such as by hard cabling, radio frequency signals (e.g., 802.11(a), 802.11(b), 802.11(g), Bluetooth, or the like), infrared coupling, telephone lines and modems, or the like. The present invention may have application in any environment where two or more users are interconnected and capable of communicating with one another.

Those skilled in the art will appreciate that the various system layers, routines, or modules illustrated in the various embodiments herein may be executable control units. The control units may include a microprocessor, a microcontroller, a digital signal processor, a processor card (including one or more microprocessors or controllers), or other control or computing devices as well as executable instructions contained within one or more storage devices. The storage devices may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions, when executed by a respective control unit, causes the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A method for controlling transmission power of a wireless unit, the method comprising:

providing a power control in a reverse link for transmitting data on a traffic channel based on a metric of a channel with continuous transmission of other data than on said traffic channel, wherein providing a cower control in a reverse link further comprises:

determining performance based on said metric for said channel to provide said power control in said reverse link when said data is not transmitted on said traffic channel.

2. A method, as set forth in claim 1, wherein providing a power control in a reverse link further comprises:

providing said power control in said reverse link of a network for said traffic channel when said data is transmitted in a bursty manner.

3. A method, as set forth in claim 1, wherein providing a power control in a reverse link further comprises:

controlling the transmission power of said wireless unit based on an outer-loop power control that provides a continuous control for a non-continuous transmission.

4. A method, as set forth in claim 3, further comprising:
adjusting a set-point associated with said power control, wherein said set-point-being used as a reference when said network is driven by said traffic channel in a bursty manner.

5. A method, as set forth in claim 4, further comprising:
adjusting the transmission power of said wireless unit for one or more packets associated with said data being sent over said traffic channel in the non-continuous transmission.

6. A method, as set forth in claim 5, further comprising:
controlling the transmission power of said wireless unit based on said outer-loop power control that provides the continuous power control for the non-continuous transmission.

7. A method for controlling transmission power of a wireless unit, the method comprising:
providing a power control in a reverse link for transmitting data on a traffic channel based on a metric of a channel with continuous transmission of other data than on said traffic channel,
using said channel to provide a continuous input sequence independent of said traffic channel for an outer-loop power control that controls the transmission power of said wireless unit; and
driving said outer-loop power control based on said continuous input sequence during a discontinuity in a traffic stream on said traffic channel.

8. A method, as set forth in claim 7, wherein driving said outer-loop power control further comprises:
driving said outer-loop power control based on a combined performance of a quality of service of at least one of a dynamic rate control feedback channel and a channel quality indicator feedback channel and a pilot channel.

9. A method for providing a power control between at least one wireless base station and at least one wireless unit, the method comprising:
combining performance of a quality of service from at least one of a first quality feedback channel and a second quality feedback channel with that of a pilot channel; and
providing an outer-loop power control in a reverse link on a traffic channel based on said combined performance of the quality of service to control transmission power of the wireless unit.

10. A method, as set forth in claim 9, wherein combining performance of a quality of service, further comprises:
determining a quality of service metric associated with a dynamic rate control channel for said first quality feedback channel; and
determining a quality of service metric associated with a channel quality indicator channel for said second quality feedback channel.

11. A method, as set forth in claim 9, further comprising:
maintaining a local set-point in each sector of an active set of sectors for a reference set-point that is used to adjust the transmission power of said wireless unit; and
updating said local set-point in said each sector at least one of a per frame basis or a sub-packet level based on said combined performance of the quality of service.

12. A method, as set forth in claim 9, further comprising:
measuring a number of radio frequency quality feedback channel erasures associated with at least one of a dynamic rate control channel for said first quality feedback channel and a channel quality indicator channel for said second quality feedback channel during the last frame or sub-packet in a spread-spectrum wireless data network.

13. A method, as set forth in claim 12, further comprising:
defining a performance target for at least one of said dynamic rate control channel and said channel quality indicator channel.

14. A method, as set forth in claim 13, further comprising:
causing a serving base transceiver station to calculate an erasure rate.

15. A method, as set forth in claim 14, further comprising:
measuring a short-term erasure rate and a long-term erasure rate.

16. A method, as set forth in claim 15, further comprising:
comparing the measured short-term and long-term erasure rates against an erasure target associated with the dynamic rate control channel.

17. A method, as set forth in claim 16, further comprising:
deriving a set point adjustment corresponding to said quality of service of metric of said dynamic rate control channel.

18. A method, as set forth in claim 16, further comprising:
deriving a set point adjustment corresponding to said quality of service metric of said channel quality indicator feedback channel.

19. A method, as set forth in claim 16, further comprising:
adjusting a local set-point based on said set-point adjustment for said reference set-point.

20. A method, as set forth in claim 19, further comprising:
measuring an average pilot chip energy to noise and interference power density ratio over a frame or a sub-frame duration.

21. A method, as set forth in claim 20, further comprising:
comparing the average pilot chip energy to noise and interference power density ratio with a threshold to determine whether a pilot error event is detected based on the threshold.

22. A method, as set forth in claim 21, further comprising:
computing a pilot error rate using an averaging filter.

23. A method, as set forth in claim 22, further comprising:
comparing the pilot error rate with a target pilot error rate to determine said set point adjustment for said reference set-point.

24. A method, as set forth in claim 21, further comprising:
adjusting said reference set-point up by an amount if the measured average pilot chip energy to noise and interference, power, density ratio is below the threshold.

25. A method, as set forth in claim 22, further comprising:
adjusting said reference set-point down by a predetermined amount if the measured average pilot chip energy to noise and interference, power, density ratio is above the threshold.

26. A method, as act forth in claim 23, further comprising:
adjusting said set-point adjustment for said reference set-point to determine a frame adjustment of a local-set point.

27. A method, as set forth in claim 26, further comprising:
adjusting at a base transceiver station said set-point adjustment for said reference set-point.

28. A method, as set forth in claim 27, further comprising:
providing a frame selector for said reverse link at a base station controller or a radio network controller for selecting one or more frames associated with a call.

29. A method, as set forth in claim 28, further comprising:
providing said set-point adjustment based on a post-frame selection performance of a traffic channel.

30. A method, as set forth in claim 29, further comprising:
maintaining a short-term average set-point at said base station controller or said radio network controller to reset a target set-point.

31. A method, as set forth in claim 27, further comprising:
adjusting said reference set-point by selecting a lowest local set-point from each base transceiver station of a plurality of base transceiver stations in an active set communication with said base station controller or a radio network controller.

32. A method, as set forth in claim 27, further comprising:
adjusting said local set-point at said base transceiver station based on a quality of service performance indication of at least one of a dynamic rate control channel and a pilot channel until a traffic frame on a traffic channel is received.

33. A method, as set forth in claim 27, further comprising:
determining whether a traffic frame is received on a traffic channel; and
if so, adjusting said local set-point based on a quality of service metric associated with, said traffic channel or based on a combination of quality of service performance metric of at least one of said traffic channel a dynamic rate control channel and a pilot channel.

* * * * *

UNITED STATES PATENT AND TRADEMARK OFFICE
CERTIFICATE OF CORRECTION

PATENT NO. : 7,636,582 B2  Page 1 of 1
APPLICATION NO. : 11/241897
DATED : December 22, 2009
INVENTOR(S) : Bi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1118 days.

Signed and Sealed this

Twenty-first Day of December, 2010

David J. Kappos
*Director of the United States Patent and Trademark Office*